United States Patent [19]
Kromwel et al.

[11] Patent Number: 5,782,564
[45] Date of Patent: Jul. 21, 1998

[54] CLUTCH RELEASE BEARING

[75] Inventors: Jean-Michel Kromwel, Amiens; Laurent Dequesnes, Fouilloy, both of France

[73] Assignee: Valeo, Paris, France

[21] Appl. No.: 666,384

[22] PCT Filed: Oct. 24, 1995

[86] PCT No.: PCT/FR95/01411

§ 371 Date: Jun. 19, 1996

§ 102(e) Date: Jun. 19, 1996

[87] PCT Pub. No.: WO96/12899

PCT Pub. Date: May 2, 1996

[30] Foreign Application Priority Data

Oct. 24, 1994 [FR] France ................... 94 12669

[51] Int. Cl.$^6$ ................ F16C 19/04; F16C 19/10
[52] U.S. Cl. ............... 384/495; 384/538; 384/539; 384/617
[58] Field of Search ................. 384/495, 903, 384/510, 517, 538, 539, 617

[56] References Cited

U.S. PATENT DOCUMENTS 4,363,615  12/1982  Euler.

FOREIGN PATENT DOCUMENTS

| 47584 | 3/1982 | European Pat. Off. . |
| 164947 | 12/1985 | European Pat. Off. . |
| 321757 | 6/1989 | European Pat. Off. . |
| 2619880 | 3/1989 | France . |
| 3540225 | 5/1987 | Germany . |
| 3810369 | 10/1989 | Germany . |
| 2162276 | 1/1986 | United Kingdom . |
| 8902991 | 4/1989 | WIPO . |

*Primary Examiner*—Lenard A. Footland
*Attorney, Agent, or Firm*—Longacre & White

[57] ABSTRACT

A clutch release bearing with a control member made of synthetic material and having a thin bearing plate (30) secured to the thrust surface (7) thereof opposite a fixed raceway (11) of a ball bearing (3), by means of tabs (32) which are provided at the outer periphery of the plate and are flexible enough to be able to bend and lockingly engage the control member.

1 Claim, 1 Drawing Sheet

CLUTCH RELEASE BEARING

BACKGROUND OF THE INVENTION a) Field of the Invention

The present invention proposes a clutch release bearing, notably designed to act on the clutch release device of the clutch of a motor vehicle. A clutch release bearing comprises in particular a centring element of the ball bearing type, on which a control member bears, usually made of synthetic material such as plastic material, actuated by a control fork, such as a clutch release fork.

b) Description of Related Art

In order to enable the automatic centring of the bearing, the ball bearing can have, in a plane perpendicular to its axis, an omnidirectional latitude of movement in relation to the control member. The radial movement of the bearing is, in a known manner, controlled by friction lock between the ball bearing and the control member.

The friction lock is obtained by a direct contact of metal against synthetic material, for example of the glass-fibre reinforced polyamide type, in order to obtain the desired friction characteristics.

However, the pressure due to the thrust of the control member and the heat emitted by the friction cause the synthetic material to creep. There is thus formed on the thrust surface a buttress of synthetic material which blocks the movement of the ball bearing in relation to the control member. This results in noise and problems with automatic centring.

SUMMARY OF THE INVENTION

To overcome these drawbacks the present invention proposes a clutch release bearing with a control member made of synthetic material, having a thrust surface opposite a fixed raceway of a ball bearing and a thin bearing plate immobilised against the said thrust surface between the said raceway of the ball bearing and the said control member, characterised in that the said bearing plate has at its outer periphery tabs which are flexible enough to bend and lock against the control member.

By virtue of the invention the bearing plate is independent of the ball bearing. It is mounted easily on the control member by force fitting.

The present invention makes it possible notably to use the same control member in the use of devices designed for small or large cubic capacities. This is because, in the case of strong forces, it suffices to prevent the metal/synthetic material contact by fitting the bearing plate proposed by the present invention.

BRIEF DESCRIPTION OF DRAWINGS

Other advantages and characteristics of the present invention will moreover emerge in the description which follows, by way of example, with reference to the accompanying drawings, in which.

DETAILED DESCRIPTION OF PREFERRED EMBODIMENT

Figure 1:
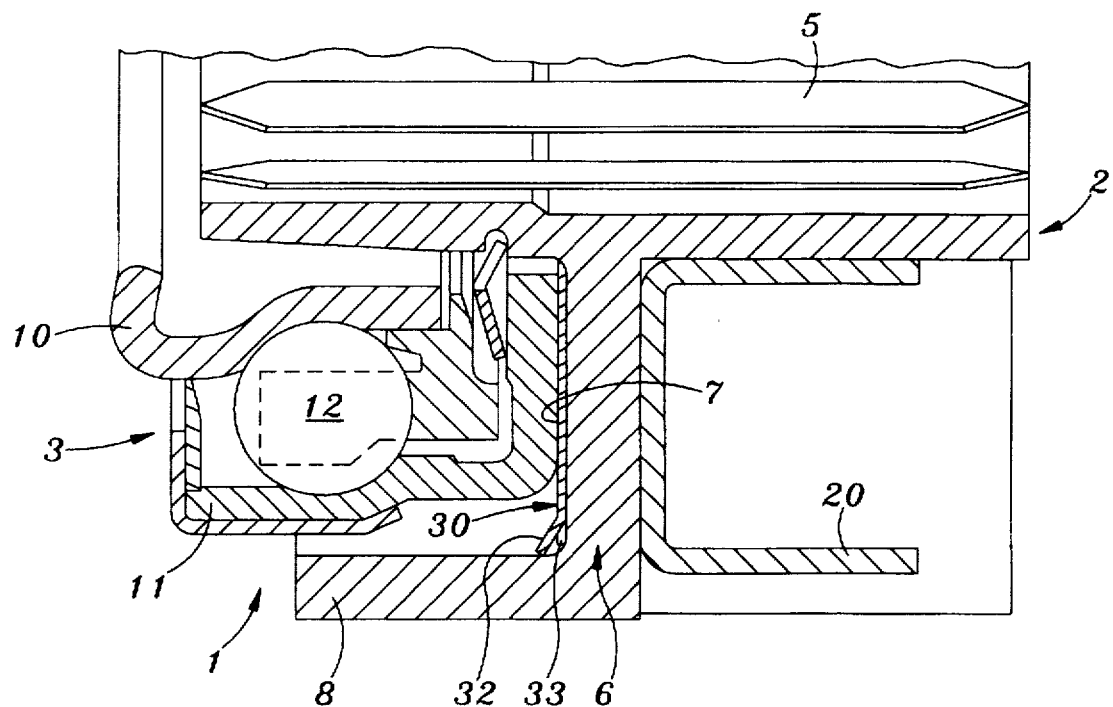
FIG. 1 is a view in half-section of a clutch release bearing provided with a bearing plate, according to an embodiment of the present invention.

A clutch release bearing 1 comprises notably a control member 2 and a ball bearing 3.

The control member 2 is a sleeve of overall cylindrical shape. Guide ribs 5 are provided on its internal surface. A projecting annular flange 6 extends radially from the external surface of the sleeve approximately half way along the said member.

This flange 6 has a thrust surface 7 against which is placed a bearing plate 30. An annular collar 8 extends the annular flange 6 from the external periphery of the latter, in the axial direction, so that the control member 2 shields the major part of the bearing 3 mounted with radial clearance in the cavity delimited by the sleeve of the control member 2, the flange 6 and the collar 8.

The ball bearing 3 for its part has an internal raceway 10, an external raceway 11, a cage, not referenced, and balls 12 inserted between the raceways 10 and 11.

The external raceway 11 constitutes the fixed raceway of the ball bearing 3. It bears, by virtue of a radial edge, not referenced, against the bearing plate 30, itself pressed against the thrust surface 7 of the control member. The internal raceway 10, in this case rotating, is profiled, in a manner known per se, in order to be able to act upon the clutch release device of the clutch, usually the diaphragm of a clutch.

The ball bearing is positioned on the control member 2 at one end of the latter, the internal raceway 10 surrounding with radial clearance the cylindrical part of the said control member and the external raceway 11 in abutment against the bearing plate 30.

A control fork 20, in this case a clutch release fork, each arm of which has an overall U-shaped section, bears against the surface of the annular flange 6 opposite the thrust surface 7. By means of this control fork, a thrust is conventionally imparted to the control member 2 which bears against the ball bearing 3 so as to bring the latter into contact with a clutch release diaphragm (not depicted), thus permitting clutch release. The control member moves in a known manner along a guide element of the guidance housing type, in which it is held by means of the guide ribs 5.

In the example described, the control member 2 is produced from synthetic material, in this case of the glass-fibre reinforced polyamide type.

The bearing plate 30 is completely annular in shape. At its centre it has a circular hole 31 which allows it to be placed around the cylindrical part of the control member 2, against the thrust surface 7 of the annular flange 6. It is produced from very thin metallic sheet commonly known as "foil".

Tabs 32 in the form of teeth are provided at the external periphery of the bearing plate 30. Notches 33, substantially radial, are provided on both sides of each tab 32. The length of the said tabs is such that they easily extend beyond the external circular edge of the bearing plate 30, whose diameter is substantially equal to the internal diameter of the annular collar 8 of the flange 6.

The bearing plate 30 is snapped onto the control member before insertion of the ball bearing 3. More precisely, the said bearing plate is driven onto the control member 2 with the aid of a press. The cylindrical part of the control member 2 passes through the hole 31 and the tabs 32 bend and are braced against the annular collar 8. The bearing plate 30 is thus immobilised against the thrust surface 7 of the control member 2.

The bearing plate 30 can optionally be provided with teeth all round its external periphery. The tabs 32 can be bent prior to assembly.

The solution proposed by the present invention makes it possible to prevent, in a simple and inexpensive manner, the creep which impairs the automatic centring of the device. It makes it possible notably to use the same control member as the clutch release device, that of a vehicle of either large or small cubic capacity. More precisely, the clutch bearing which has just been described can be considered as a standard component capable of being fitted in very different vehicles.

For vehicles of large cubic capacity, the presence of the bearing plate is indicated, if not imperative. For vehicles of small cubic capacity, the bearing plate can be omitted. The small thickness of the bearing plate makes any adaptation superfluous.

Figure 2:
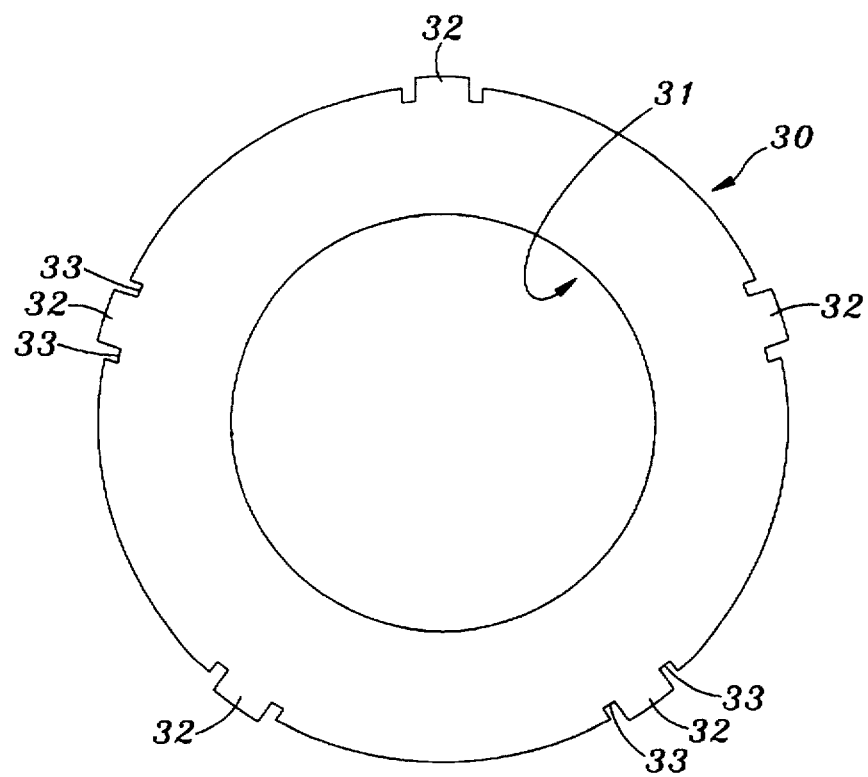
FIG. 2 is a view in elevation of the bearing plate of FIG. 1.

Here the clutch release bearing 1 is of the type described in the document FR-B-2 619 880 (FIGS. 1 to 3). Thus it has, within the bearing 3, an elastic washer, not referenced, bearing on the metallic radial edge of the external raceway 11 and engaged in a groove, not referenced, provided in the sleeve of the control member 2. This elastic washer is of dihedral shape and is turned, when the bearing is inserted, by a mounting part belonging to the bearing cage.

The bearing 3 can thus move, in a manner known per se, radially for the automatic centring of the bearing 1, controlled by the said elastic washer forcing the radial edge of the raceway 11 axially against the plate 30.

Obviously, the elastic washer can be of the type in FIGS. 4 to 6 of the aforementioned document FR-B-2 619 880.

It is possible to reverse the structures, the internal raceway then being fixed whilst the external raceway is mobile.

In this case, the internal raceway has a radial flange directed towards the outside so as to bear against the bearing plate.

It will be appreciated that the annular flange 6 of transverse orientation has a simpler shape than that of the document WO 89 0 2291, which is hollowed for mounting the bearing plate.

In addition, contrary to the solution described in the document EP-A-0 047 584, this bearing plate is independent of the ball bearing. There is no need to provide means for locking the rotation of the bearing plate since this is achieved by virtue of the tabs 31 according to the invention, which come to be anchored in the control member 2.

In addition, contrary to the solution described in the document DE-A-38 10 369, this bearing plate does not cross the annular flange 6, which is thus not rendered fragile.

Obviously the length of the collar 8 can be shortened. In this case, this collar 8 can be split into annular sections, the number of which depends on that of the tabs 32.

It will be noted that the bearing plate 30 can be used universally, it being possible either to provide the fixed raceway of the ball bearing with a radial edge or not to do so.

We claim:

1. Clutch release bearing (1) with a control member (2) made of synthetic material, having a thrust surface (7) opposite a fixed raceway (11) of a ball bearing (3) and a thin bearing plate (30) immobilized against said thrust surface (7) between said raceway (11) of the ball bearing and said control member (12), characterized in that said bearing plate (30) has, formed at its outer periphery, tab (32) which are flexible enough to bend and lock against the control member (2), in that said tabs (32) are of a length such that the tabs (32) extend slightly beyond the external edge of the bearing plate (30), and in that said tabs (32) are braced against an annular collar (8) which extends, in the axial direction, said thrust surface.

* * * * *